United States Patent [19]
Couzens

[11] Patent Number: 4,860,986
[45] Date of Patent: Aug. 29, 1989

[54] MOUNTING RACK

[76] Inventor: Kenneth A. Couzens, 56965 Panchita Rd., Yucca Valley, Calif. 92284

[21] Appl. No.: 245,559

[22] Filed: Sep. 19, 1988

[51] Int. Cl.$^4$ ............................................... A47K 1/08
[52] U.S. Cl. ..................................... 248/313; 248/310
[58] Field of Search ............ 248/313, 314, 310, 224.3, 248/222.1, 309.1, 311.2

[56] References Cited

U.S. PATENT DOCUMENTS

| | | | |
|---|---|---|---|
| 925,053 | 6/1869 | Hunter | 248/310 X |
| 1,222,143 | 4/1917 | Rowell | 248/313 |
| 1,600,181 | 9/1926 | Kivi | |
| 1,617,768 | 2/1927 | Ruff | |
| 1,639,563 | 8/1927 | Hays | |
| 1,740,368 | 12/1929 | Nusser | |
| 2,732,155 | 1/1956 | Stanley | 248/310 |
| 3,050,223 | 8/1962 | Scioloro | 248/313 X |
| 3,194,529 | 7/1965 | Brock | 248/313 |
| 3,263,862 | 8/1966 | Tazzeo | 248/224.3 X |
| 3,269,683 | 8/1966 | Shinaver | 248/313 X |
| 3,305,200 | 2/1967 | Avery | 248/224.3 X |
| 3,815,388 | 6/1974 | Nichol et al. | 70/63 |
| 4,006,852 | 2/1977 | Pisner et al. | 224/42.03 |
| 4,036,463 | 7/1977 | Hopkins et al. | 248/309.1 |
| 4,326,832 | 3/1982 | Edstrom | 248/314 X |
| 4,327,849 | 5/1982 | Sharpton | 224/42.03 X |

Primary Examiner—Alvin C. Chin-Shue
Attorney, Agent, or Firm—Harvey S. Hertz

[57] ABSTRACT

A mounting rack for a water jug includes a vertical arm interconnected at one end to a support and its other end to a mounting structure. The support has means for supporting the bottom base of the water jug. A jug securing mechanism is integrally formed with a vertical arm for securing the jug at the jug sides to the mounting rack. The mounting structure has means for connecting the mounting rack to a fixed structure.

3 Claims, 2 Drawing Sheets

MOUNTING RACK

BACKGROUND OF THE INVENTION

1. Field of the Invention

The field of art to which the invention pertains includes the field of mounting racks, and more particularly, to a mounting rack which can support a water jug while being transported in a truck bed as well as repositioning the jug for use when the truck is not in transit, or for supporting the jug when removed from the truck bed.

2. Description of the Prior Art

Conventional prior art supports for liquid jugs are well known. For example, supports can be used for transporting fluids such as gasoline in a jug when additional gasoline is required in addition to that contained in the fuel tank. Other racks may be used to support other types of fluid jugs. The present invention utilizes a mounting rack which enables the water jug to be transported in a truck bed and repositioned on the truck bed for use when the truck is no longer in transit, enabling easy access to the water jug without entering the truck bed. In addition, the present invention enables the water jug and the support structure to be removed from the truck and repositioned to a place where the water jug can be used.

Known prior art includes U.S. Pat. Nos. 1,639,563; 1,740,368; 1,600,181; 1,617,768; 3,815,388; 4,327,849; and 4,006,852.

SUMMARY OF THE INVENTION

A mounting rack for a water jug includes a vertical arm interconnected at one end to a support and at its other end to a mounting structure. The support has means for supporting the bottom base of the water jug. A jug securing mechanism is integrally formed with the vertical arm for securing the jug at the jug sides to the mounting rack. The mounting structure has means for connecting the mounting rack to a fixed structure.

The advantages of this invention both as to its construction and its mode of operation will be readily appreciated when the same becomes better understood with respect to the accompanying drawings in which like referenced numerals indicate like parts throughout the figures.

DESCRIPTION OF THE PREFERRED EMBODIMENT

Figure 1:
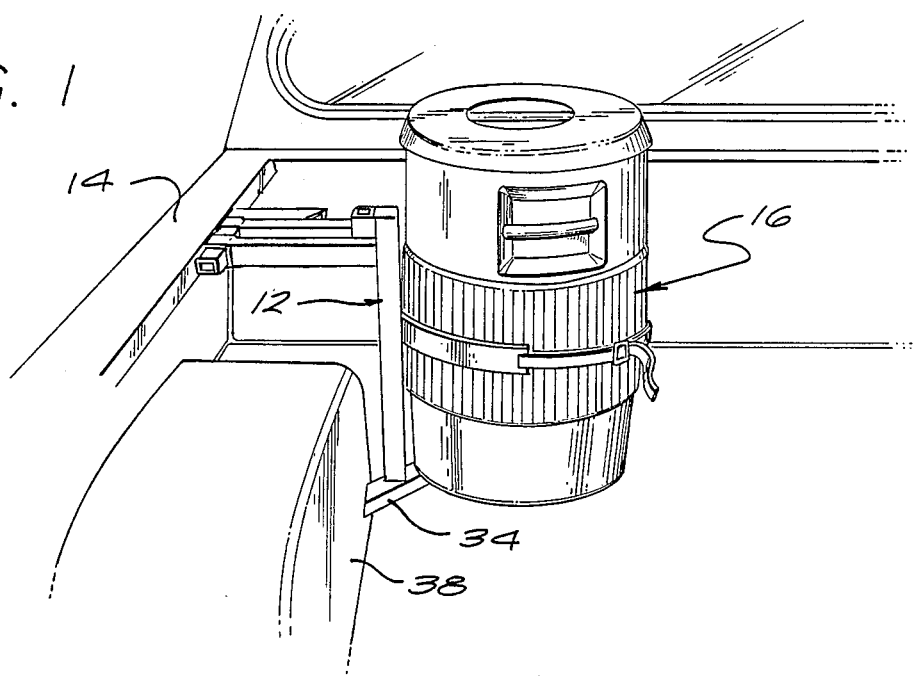
FIG. 1 is a perspective view of the mounting rack illustrating transit of a water jug in a truck bed.

Referring now to the drawings as shown in FIG. 1, a mounting rack 12 constructed in accordance with principles of the invention. The mounting rack 12 is illustrated being secured to the bed of a truck 14 and having a water jug 16 secured thereon. Typically, the jug 16 contains water or other fluid for consumption by a workman where a ready supply of water is not available, such as at a construction site.

Figure 2:
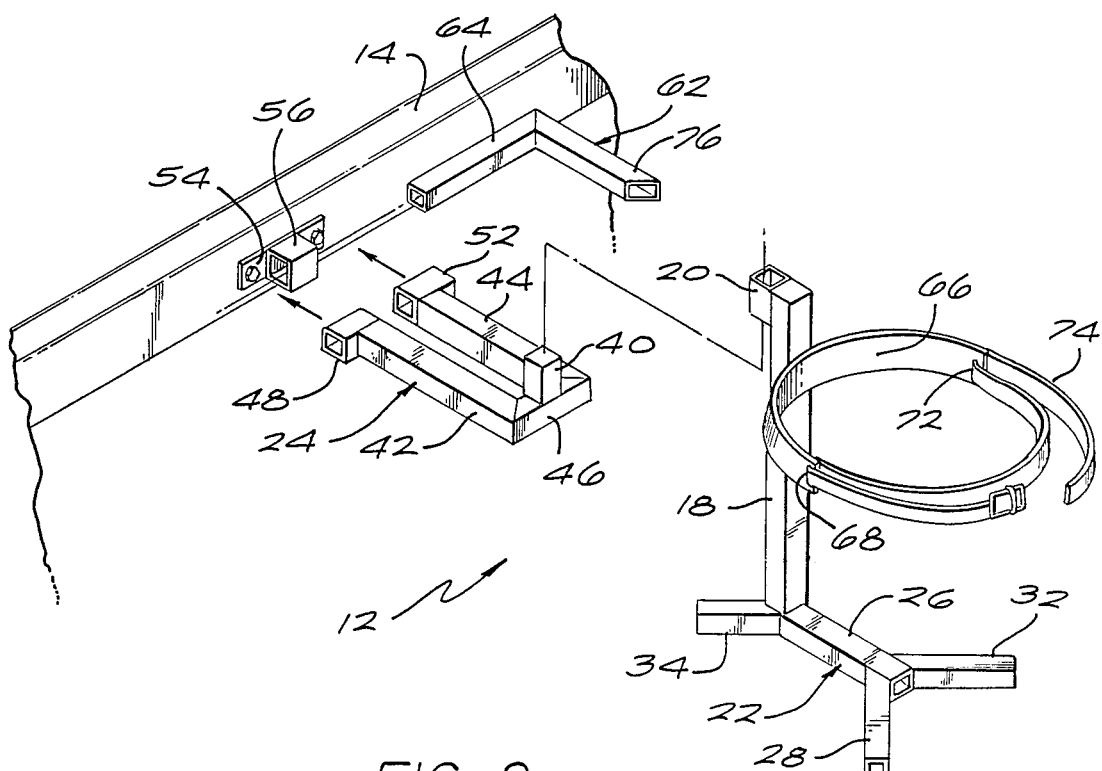
FIG. 2 is an exploded perspective view of the mounting rack in the truck bed of FIG. 1.

The mounting rack 12 of FIG. 1 is shown in greater detail in FIG. 2 and includes a vertical arm 18 which interconnects a support 22 at its lower end and a mounting structure 24 at its top end. Typically, the vertical arm 18 is of generally square or rectangular hollow configuration and is made of steel. However, other metals such as aluminum or even wood could be used as well.

The support 22 includes a horizontal central leg 26 which is of generally similar material and cross-sectional dimensions as the vertical arm 18 and is secured to and extends from one end of the vertical arm 18. The other end of the central leg 26 contains a pair of angularly extending support legs 28 and 32. The central leg 26 and the support legs 28 and 32 form the base support for the bottom of the water jug 16 illustrated in FIG. 1.

A pair of positioning legs 34 and 36 extend in a direction opposite to that of the central leg 26 from the bottom of the vertical arm 18 and are used to maintain the vertical arm 18 and hence the jug 16 in a generally vertical position as shown in FIG. 1. Typically, the positioning legs would abut the wheel housing surface 38, which extends into the bed of the truck 14 (FIG. 1). Alternatively, of course, the positioning legs 34 and 36 could abut any vertical surface to which the mounting rack is attached, as will be explained hereinafter, such as in the embodiment of FIG. 4.

The top end of the vertical arm 18 has hollow attachment leg integrally formed therewith. The axis of leg 20 is parallel to the axis of the vertical arm 18.

The mounting structure 24 is generally U-shaped and includes a pair of horizontal arms 42 and 44 which are joined at one of their ends to an end arm 46.

A mounting post 40 is integrally formed with the top surface of the end arm 46. The mounting post 40 outer dimensions are slightly smaller than the inner dimension of the attachment leg 20 enabling the attachment leg to be slidably moveable thereover.

The horizontal arms 42 and 44 are spaced apart and have a pair of hollow square brackets 48 and 52 attached at the free ends of the horizontal arms 42 and 44, respectively. The hollow square brackets 48 and 52 could be made of the same material as the vertical arm 18. To attach the mounting structure 24 to the bed of truck 14, an attachment plate 54 is bolted or otherwise secured to the truck bed. The attachment plate has a fixed hollow bracket 56 secured thereto. The fixed hollow bracket 56 is normally made of the same material and the same dimensions as the hollow square brackets 48 and 52 and the width thereof is such that the adjacent surfaces of the hollow square brackets 48 and 52 are positioned so that they are adjacent to the adjacent surfaces of the fixed hollow bracket 56. In this position, the arm 64 of an L-shaped interconnecting bracket 62, whose outer dimensions are slightly smaller than the inner dimensions of the hollow square brackets 48 and 52 as well as the fixed hollow bracket 56 is slidably inserted into the hollow square bracket 52, the fixed hollow bracket 56, and the hollow square bracket 48.

A jug securing mechanism formed of a flexible metal semicircular arm 66 is secured to the vertical arm 18 at its center and the free ends of the arms contain a pair of vertical slots 68 and 72 into which a belt is secured and used to secure the water jug 16 to the mounting rack 12.

Figure 3:
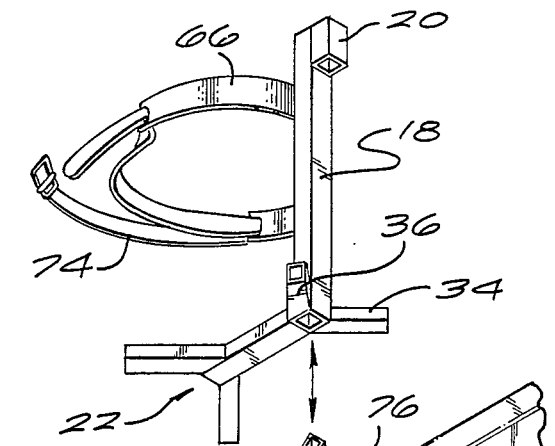
FIG. 3 is a perspective view of the mounting rack in an alternate position wherein the water jug can be mounted exterior of the truck bed.

As illustrated in FIG. 3, when the water jug 16 has been transported to a place where the jug is to be used yet access to the jug is desired without entering the bed of truck 14, the L-shaped interconnecting bracket 16 is rotated 90 degrees so that the arm 76 is in a vertical position while tee arm 64 is inserted in the fixed bracket 56. The vertical arm 18 is then placed so that it is slidably inserted from its bottom over the vertical arm 76 of the interconnecting bracket 62. In this position, the water jug 16 is accessible from the exterior of the truck 14.

Figure 4:
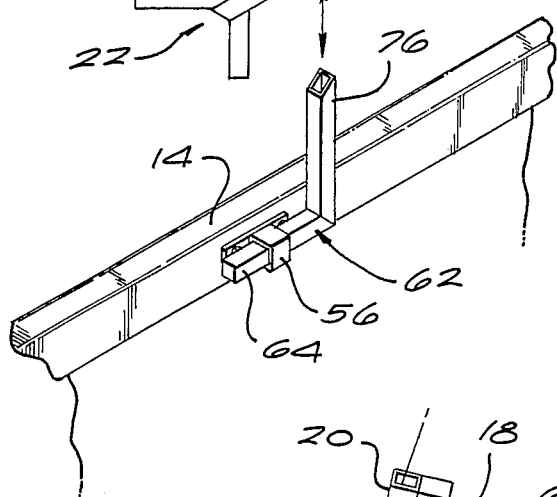
FIG. 4 is a perspective view of the mounting rack positioned for use off a truck.
Figure 4:
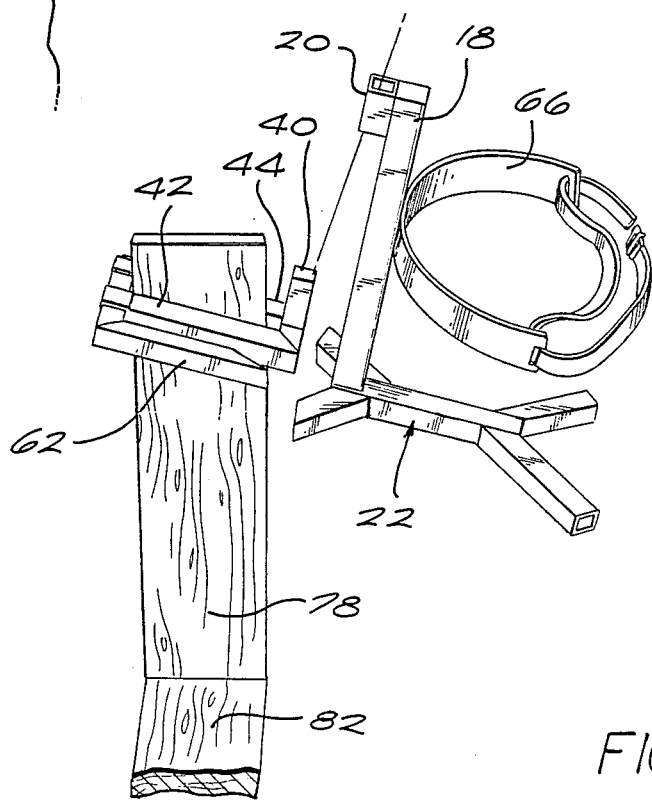

As illustrated in FIG. 4, the mounting rack 12 is moved so that the mounting arms 42 and 44 are supported on a vertical piece of lumber such as a two by four 78 attached to a horizontal two by four 82. The fixed positioned legs extend on opposite sides of the two by four 78. It should be noted that the mounting structure 24 is positioned at a slight angle from the horizontal plane in FIG. 4. The distance between the adjacent surfaces of the end arm 46 and the bracket arm 64 is slightly greater than the wide dimensions of two by four 78. However, it has been found that the angular position of the mounting structure 24 together with the weight of the jug 16 is sufficient to prevent slippage of the mounting rack 12 with respect to the two by four 78.

It should be noted that in the embodiment of FIG. 4, the bracket arm 64 is slidably positioned in hollow square brackets 48, 52, the hollow bracket 56 of FIG. 2 not needed in this arrangement.

Figure 5:
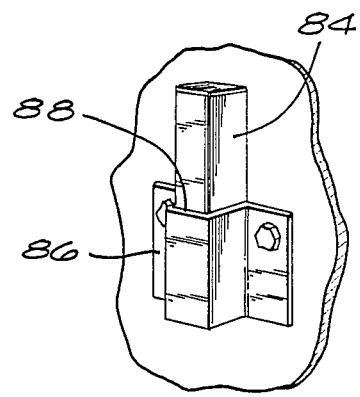
FIG. 5 is a partial perspective view of an alternate mounting arrangement.

FIG. 5 illustrates an alternative mounting arrangement for the securing the vertical arm 18 to a fixed structure without the need for the mounting structure 24. In FIG. 5, a vertical post 84 whose dimensions are similar to that of mounting post 40, is secured to a mounting plate 86. The post includes an upwardly facing shoulder or stop 88. Thus the vertical arm 18 can be attached to the post 84 with the attachment leg 20 positioned thereon.

I claim:

1. A mounting rack for a liquid storage jug comprising:

a hollow vertical arm which interconnects a support at its lower end and a mounting structure at its top end;

said support comprising a horizontal central leg which is secured to and extends at one end from adjacent the lower end of said hollow vertical arm, the other end of said central leg having a pair of horizontal support legs extending therefrom, said horizontal central leg and said horizontal support legs forming means for supporting the liquid storage jug thereon;

positioning legs extending in a horizontal plane from adjacent the lower end of said hollow vertical arm in a direction generally opposite to the direction said central leg extends;

a hollow attachment leg integrally formed with the top end of said vertical arm on a side of said vertical arm opposite to said central leg and having an axis parallel to the axis of said vertical arm; and a jug securing mechanism connected to the central portion of said vertical arm for attaching said liquid storage jug to said mounting rack.

2. A mounting rack in accordance with claim 1 and further comprising a mounting structure of generally U-shaped configuration including a pair of horizontal arms joined at one of their ends to an end arm; a vertical mounting post integrally formed with the top surface of said end arm, the vertical mounting post outer dimensions being slightly smaller than the inner dimensions of said hollow attachment leg enabling said attachment leg to be slidably movable thereover.

3. A mounting rack in accordance with claim 2 and further comprising hollow brackets attached to the free ends of said horizontal arms, an attachment plate having means for securing said plate to a fixed structure, and having a hollow fixed bracket whose inner dimensions are generally the same as said hollow brackets; an L-shaped interconnecting bracket having an arm whose outer dimensions are slightly smaller than the inner dimensions of said hollow brackets and the fixed hollow bracket, said L-shaped bracket arm being slidably insertable into said hollow bracket and said hollow fixed bracket.

* * * * *